May 26, 1964  M. VON ARDENNE ETAL  3,134,626
SAFETY BELT FOR PASSENGERS OF VEHICLES
Filed Feb. 12, 1962
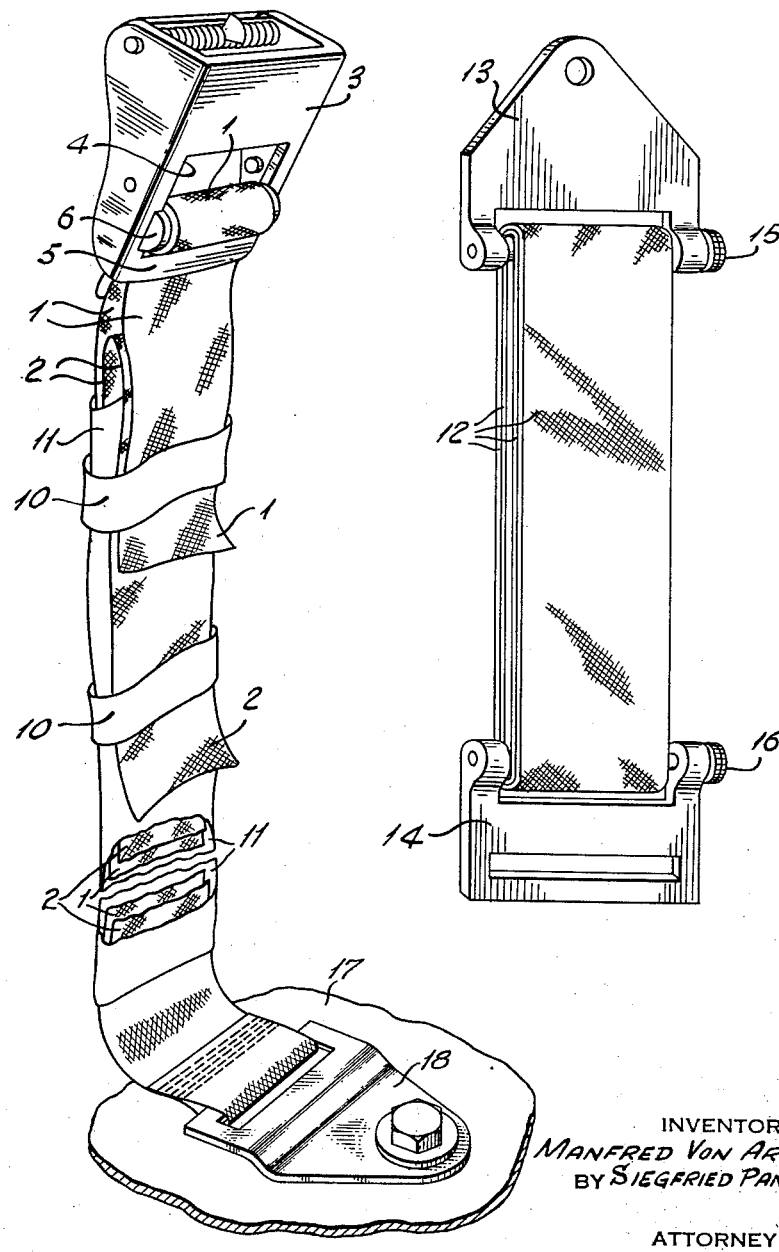
INVENTORS
MANFRED VON ARDENNE
BY SIEGFRIED PANZER
ATTORNEY

United States Patent Office 3,134,626
Patented May 26, 1964

3,134,626
SAFETY BELT FOR PASSENGERS OF VEHICLES
Manfred von Ardenne, Zeppelinstrasse 7, Dresden-Weisser Hirsch, Germany, and Siegfried Panzer, Knappestrasse 24, Dresden A–21, Germany
Filed Feb. 12, 1962, Ser. No. 172,541
5 Claims. (Cl. 297—386)

This invention relates to safety belts and, in particular, to belts for passengers of vehicles.

Known belts of this type consist of a tear-proof material having at high stresses relatively small parmanent deformation, while generally presenting elastic resilience. For this purpose, preferably polyester fibers are used. Deformation occurs in a definite load range. Since inertial forces depend on the weight of the attached person, at higher values of belt expansion, said mass is subject to a braking effect having a mass-dependent time delay. When the known belts are used by very heavy persons, the belt is stretched with relatively little delay and, consequently, without noticeable braking effect. Thus, the attached person is liable to hit against obstacles, e.g., against the instrument panel, the back of the front seat, or against other objects. The stretching capacity is not fully exploited in case of light persons or children so that the belt only acts as a "holding belt." The incurring delay may reach excessive values leading to serious accidents.

With a view of eliminating these dangers, the present invention provides the safety belt or part thereof to be made from a plastically deformable material substantially inelastic to elongation. Below a predetermined load value, such a material has only negligible elastic elongation, while it undergoes plastic deformation upon attaining a certain load value, at identical load values. Even in its unstressed condition, the belt will have a greater length than before, once it has been subjected to considerable elongation. The kinetic energy of the passenger being hurled forward inside the vehicle during an accident is transformed into heat by the permanent deformation of the safety belt. The inelastic stretchability of the safety belt allows the distance between the passenger and the obstacle in front of him to be fully exploited as a brake path (inner brake path of the vehicle). This is most important from the point of view of accident prevention. Preferably, a woven band of about 8 centimeter width is used for the safety belt, the warp threads consisting of non-stretched or only partly stretched polyamide fibers while the weft threads may be made of any kind of textile fibers. The safety belts of the kind just described can be adapted to the measurements of individual passengers and, consequently, to the inertial forces released during an accident, by preferably assembling each safety belt from two superimposed belt portions. Each of the portions would have the stated characteristics; however, a smaller or larger number of such portions may be connected so as to suit the measurements of the particular passenger to be protected. Only one of the belt portions should be used for children.

The invention may be practiced in connection with safety belts of the known type, provided they present sufficient strength, by incorporating in these belts an additional delay limiter according to the present invention. Such a limiter consists of a material substantially inelastically deformable during elongation.

Other objects and attendant advantages of the invention will become more apparent from the following description, when considered in conjunction with the accompanying drawing, in which:

FIG. 1 is a perspective showing of a safety belt according to the present invention, with parts broken away; and FIG. 2 is an elevational view of a delay limiter according to the invention, to be used in conjunction with regular type safety belts.

In a known manner, each safety belt consists of two portions connected to each other at their adjoining ends by an easily releasable buckle. The other ends of the belt portions may be releasably secured to door frames, car floors, cardan casings or frame parts of the vehicles.

As seen in FIG. 1, each safety belt portion consists of two belt parts 1 and 2, each made from a woven band having non-stretched or only partly stretched polyamide warp threads. The belt parts 1 and 2 have different strengths. As a matter of example, part 1 may have a flow deformation strength corresponding to the mass or weight of an attached person weighing 55 kilograms, while part 2 may present a flow deformation strength suitable for 35-kg. passengers. The two belt parts consequently allow an adjustment for three different values, namely for persons weighing 35, 55 or 90 kilograms, respectively, depending on whether the stronger or the weaker belt part is attached alone, or both of them simultaneously. By providing two belt parts, as shown, the tolerance limit of the delay time may be adjusted with an accuracy of about 20% for practically all persons weighing between 30 and 100 kgs. Considering a transversely applied shoulder belt, 30 to 40 $g$ can be considered as the delay time which can be endured during an accident without noteworthy bodily harm, "$g$" denoting the free fall acceleration. A buckle portion 3 of conventional construction holds the belt parts 1 and 2. As shown in the lower portion of FIG. 1, the remote ends of the belt portions are releasably secured, e.g. as shown at 18, with a conventional link member, to a frame part 17 or the like of the vehicle. The frontal portion of the buckle has a window 4, the lower edge of which is limited by a ledge portion 5. Either or both of the belt parts 1 and 2 are guided around a peg 6 having diametrical peripheral recesses adapted to engage the side walls of the window portion 4. The pull exerted on the attached belt parts forces the peg 6 downward so that the belt 1, 2 is clamped between said peg 6 and the ledge 5.

If the belt part 2 is not attached, it is folded back and pushed under one or more loops 10, together with the free end of the attached belt part 1. When the part 1 is elongated during an accident, the part 2 follows without any effect. Although a known frictional type buckle has been described for adjusting the belt length at the forward end of the safety belt, it is understood that attachment may also be provided at the opposite end of the belt portions.

Two band parts should normally suffice for satisfying all strength requirements of the safety belt to be encountered with pasengers having different weights. Nevertheless, there is no difficulty in increasing the number of the band parts, e.g., to three. Another possibility, entirely within the scope of the present invention, is to keep on hand several safety belts each consisting of a single band having a different strength, and to allocate the proper one to the passenger, which corresponds to his body weight.

With a view to preventing premature aging of the belts, they are preferably covered with a thermoplastic foil or layer 11, adapted to absorb ultraviolet rays, except if suitable stabilizers have been incorporated in the belts which sufficiently retard the aging of the non-stretched or partly stretched polyamide silk threads.

Instead of making the entire safety belt from a material inelastically deformed during elongation, it may be sufficient in certain cases to use a delay limiter in conjunction with already existing, tear-proof safety belts of known structure. FIG. 2 shows such a limiter having one or more endless woven bands 12 secured to link members 13 and 14. The bands 12 are preferably made from non-stretched polyamide silk; they are easily removable by means of screws 15 and 16 engaging appropriate bores of the respective members 13 and 14. Taking into account the mass of the passenger concerned, one or more of these bands of appropriate strengths will be used. The elongation values may be selected in accordance with the above-explained considerations.

It will be understood that several variants and deviations from the above-described preferred embodiments are feasible which are entirely within the scope of the present invention, except as limited by the attached claims.

What is claimed is:

1. A safety belt for passengers of vehicles and the like, comprising at least two substantially superimposed belt portions of substantially identical widths and deformable upon application of load, said belt portions being made from a plastically deformable material which is substantially inelastic to elongation when nearly constant load is applied, supporting means secured to the vehicle, first means for attaching one end of the belt portions to said supporting means, buckle means releasably connectable with at least one of said belt portions, and second means for selectively attaching the other ends of the remaining belt portions to said buckle means, whereby the load-bearing capacity of the safety belt may be varied depending on the number of belt portions attached at both of their ends.

2. A safety belt according to claim 1, wherein said belt portions have dissimilar load-bearing capacities, so that the selective single and plural connection of each and of more than one belt portion to said second attaching means yields a plurality of different applicable load values.

3. A safety belt according to claim 1, further comprising at least one loop member adapted to surround the belt portion attached to said buckle means and loosely to hold therein the other belt portions when they are not attached to said buckle means.

4. A safety belt according to claim 1, further comprising a thermoplastic sleeve member made from a material adapted to absorb ultraviolet and sunlight, at least one of said belt portions being capable of being passed through said sleeve member before being secured to said buckle means, so that aging of said at least one belt portion is effectively retarded.

5. A safety belt according to claim 1, wherein at least one of said belt portions consists of an endless woven band having warp threads of at least partly stretched synthetic fibers.

References Cited in the file of this patent

UNITED STATES PATENTS

| | | |
|---|---|---|
| 2,475,588 | Bierman | July 12, 1949 |
| 2,613,865 | Rose | Oct. 14, 1952 |
| 2,639,852 | Sanders | May 26, 1953 |
| 2,665,143 | Rasmussen | Jan. 5, 1954 |
| 2,739,642 | Riedell | Mar. 27, 1956 |